US011356516B1

(12) United States Patent
Wu et al.

(10) Patent No.: US 11,356,516 B1
(45) Date of Patent: Jun. 7, 2022

(54) CLIENT-SIDE CACHING OF MEDIA CONTENT

(71) Applicant: Amazon Technologies, Inc., Seattle, WA (US)

(72) Inventors: Yongjun Wu, Bellevue, WA (US); Kyle Koceski, Seattle, WA (US); Kyle Alexander Woo, Kent, WA (US); Vasanthakumar Soundararajan, Seattle, WA (US); Shiranchai Taneja, Sammamish, WA (US); Shyam Krishnan Krishnan Moni, Seattle, WA (US); Jake O'Halloran, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/443,313

(22) Filed: Jul. 23, 2021

(51) Int. Cl.
*G06F 15/16* (2006.01)
*H04L 67/141* (2022.01)
*H04L 67/02* (2022.01)

(52) U.S. Cl.
CPC ............ *H04L 67/141* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 10,432,690 B1* | 10/2019 | Li ......................... | H04L 65/607 |
| 10,863,211 B1* | 12/2020 | Wu ...................... | H04N 21/812 |
| 2016/0323606 A1* | 11/2016 | Mao .................. | H04N 21/64707 |
| 2017/0374121 A1* | 12/2017 | Phillips ............. | H04N 21/26258 |
| 2019/0146951 A1* | 5/2019 | Velmurugan .......... | H04N 21/84 707/822 |
| 2021/0160551 A1* | 5/2021 | Hou .................... | H04N 21/6125 |
| 2021/0274241 A1* | 9/2021 | Cava .................... | H04N 21/812 |

* cited by examiner

*Primary Examiner* — Quang N Nguyen
(74) *Attorney, Agent, or Firm* — Weaver Austin Villeneuve & Sampson LLP (57) ABSTRACT

Methods and apparatus are described for facilitating the client-side caching of media content based on one or more properties of the media content. Information relating to the cacheability of different types of content is communicated to the media player on a client device in the manifest or playlist employed by the media player to request fragments of the media content. The media player uses this information to make decisions about how to cache the corresponding content.

20 Claims, 4 Drawing Sheets

CLIENT-SIDE CACHING OF MEDIA CONTENT

BACKGROUND

Streaming technologies have become an important mode of delivery of media content to hundreds of millions of consumers on a daily basis. A variety of mechanisms have been developed that attempt to optimize the use of network and computing resources, as well as the quality of the content delivered. For example, the caching of content in the edge servers of content delivery networks makes more efficient use of network resources by serving the same cached content to many client devices.

The client-side caching of content may also be desirable for multiple reasons at least some of which relate to optimizing the user experience. For example, caching content locally on a client device reduces the time-to-first frame, i.e., the time between when the media player on the client device requests content for playback and the appearance of the first frame of content on the client device's display. In addition, when a media player transitions between different types of content (e.g., between primary content and advertising content), the different content often corresponds to different URLs. This type of transition sometimes results in buffering events, i.e., when the client device runs out of content to display. But if the content is available in the client device's cache, this issue is eliminated. Moreover, the quality of cached content is typically high, so use of cached content can provide a better user experience.

Media players on a client device typically employ a cache eviction algorithm to make decisions about whether to maintain particular content in the local cache. It is therefore desirable to improve the operation of such algorithms to enhance the user experience.

DETAILED DESCRIPTION

This disclosure describes techniques for facilitating the client-side caching of media content based on one or more properties of the media content. Information relating to the cacheability of different types of content is communicated to the media player on a client device in the manifest or playlist employed by the media player to request fragments of the media content. For example, the information might identify particular types of content as long-term or short-term cacheable. In another example, the information might represent the extent to which particular content may be integrated or displayed with other content. The media player uses this information to make decisions about how to cache the corresponding content. An example may be illustrative.

Figure 1:
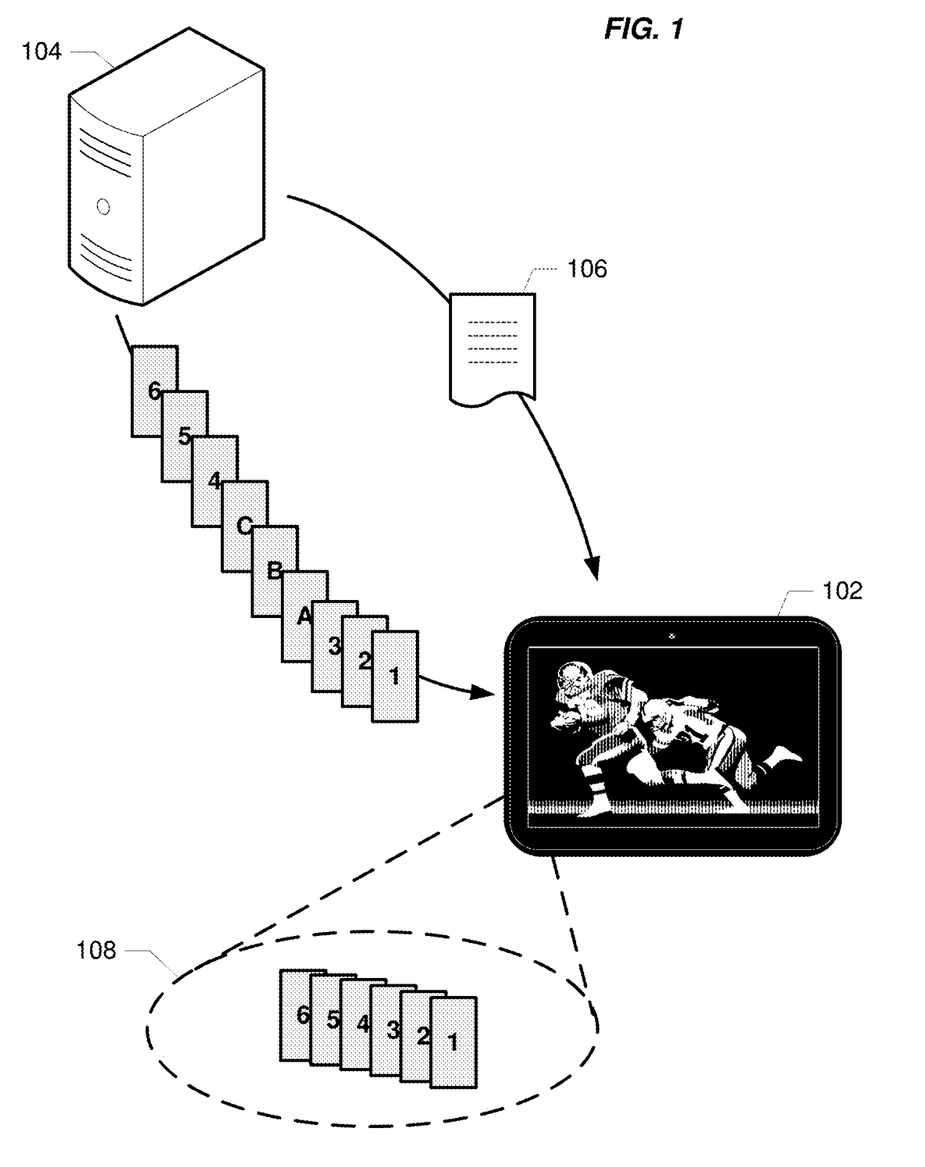
FIG. 1 illustrates an example of an implementation enabled by the present disclosure.

FIG. 1 shows a client device 102 interacting with a content service 104 to consume a stream of media content. When a user associated with client device 102 selects primary content (e.g., a movie, an episode of a television series, or a live event) for viewing, content service 104 provides information required by the media player on client device 102 to establish a streaming session and request fragments of the content. The information includes a manifest or playlist 106 that enables the media player to generate properly formatted requests for specific ranges of content to particular network locations (e.g., URLs).

Manifest/playlist 106 may be a "stitched" manifest or playlist that includes references to different types of content from different sources that are to be delivered at different times during the streaming session. The different types of content might include, for example, fragments of the selected primary content and fragments of secondary content such as, for example, advertising content that is dynamically inserted between ranges of the primary content during playback.

According to a particular class of implementations that relates to Dynamic Adaptive Streaming over HTTP (DASH), manifest 106 represents the different types of content as different periods of the corresponding media presentation. Associated with each period represented in the manifest is metadata that represents the cacheability of the content of that period. For example, the primary content might be high-value premium content that the user is likely to view multiple times. Thus, the manifest metadata might identify the periods of primary content as long-term cacheable to increase the likelihood that when future requests for the primary content are made, they may be serviced from the local cache.

By contrast, advertising content is typically dynamically selected for insertion in such a media presentation and is likely to expire and/or be replaced with different advertising content in subsequent viewings of the primary content. In this case, the manifest metadata might identify a period of advertising content as short-term cacheable or even as not cacheable at all. This is represented in FIG. 1 by the caching of fragments 1-3 and 4-6 (representing different periods of primary content) in cache 108 of client device 102, while fragments A-C (representing a dynamically inserted advertisement) are not cached.

By communicating the cacheability of different types of content to a client device, the media player on the client device can make better decisions regarding whether and how to cache different types of content and/or how long to maintain cached content in the associated cache. It should be noted that the present disclosure is not limited to client-side caching of streamed content. That is, the cacheability syntax enabled by the present disclosure may be used by a client device in the context of downloaded content to manage different types of content in a download library, or by other platforms (e.g., a CDN edge server) to support cache decision making.

Figure 2:
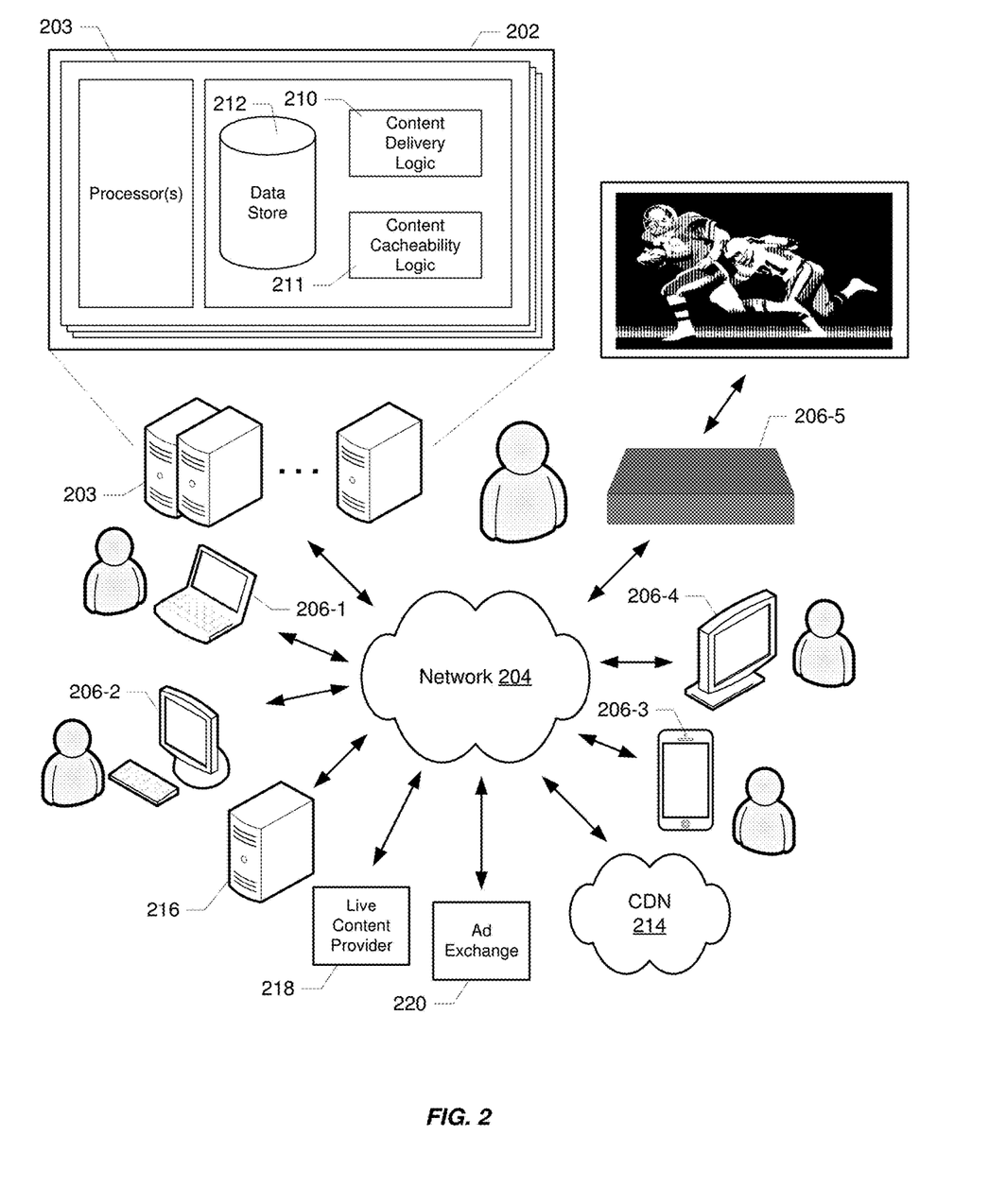
FIG. 2 illustrates an example of a computing environment in which implementations enabled by the present disclosure may be practiced.

FIG. 2 illustrates an example of a computing environment in which a content service 202 provides streaming content (live, broadcast, video-on-demand, etc.) via network 204 to a variety of client devices (206-1 through 206-5) in accordance with the techniques described herein. Content service 202 may conform to any of a wide variety of architectures such as, for example, a services platform deployed at one or more co-locations, each implemented with one or more servers 203. Network 204 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, and so on. Client devices 206 may be any suitable device capable of connecting to network 204 and consuming content provided by service 202. Such devices may include, for example, mobile devices (e.g., cell phones, smart phones, and tablets), personal computers (e.g., laptops and desktops), set top boxes (e.g., for cable, satellite, and online systems), digital personal assistant devices, smart televisions, gaming consoles, wearable computing devices (e.g., smart watches or smart glasses), etc.

At least some of the examples described herein contemplate implementations based on computing models that enable ubiquitous, convenient, on-demand network access to a shared pool of computing resources (e.g., networks, servers, storage, applications, and services). As will be understood, such computing resources may be integrated with and/or under the control of the same entity controlling content service 202. Alternatively, such resources may be independent of content service 202, e.g., on a platform under control of a separate provider of computing resources with which content service 202 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 202 is described as if it is integrated with the platform(s) that provides all of the different types of content and manifest data to client devices. However, it will be understood that content service 202 may provide access to content in conjunction with one or more content delivery networks (e.g., CDN 214) that may or may not be independent of content service 202. In addition, the source(s) of the different types of content may or may not be independent of content service 202 (e.g., as represented by content provider server 216, live content provider 218, and ad exchange 220). In addition, a manifest service that provides manifest data as described herein may be separate from the source of the content. The range of variations known to those of skill in the art are contemplated to be within the scope of this disclosure.

The various implementations enabled by the present disclosure contemplate logic resident on the client devices consuming media content from content service 202, such logic being configured to use metadata provided in manifests or playlists as input to support making decisions relating to the caching of media content as described herein. Such logic might be part of an existing algorithm or module on the client device (e.g., a media player) or implemented to work in conjunction with such an algorithm or module.

It should also be noted that implementations are contemplated in which, in addition to content delivery logic 210 (which facilitates various aspects of content delivery to client devices 206), content service 202 may include other types of logic, e.g., logic 211 that facilitates generation and communication of cacheability metadata for different types of content. For example, such logic might be configured to insert cacheability metadata in stitched manifests or playlists that include primary content (e.g., content from content service 202, content server 216, or live content provider 218) and secondary content (e.g., content from ad exchange 220).

In addition to providing access to media content, content service 202 may also include a variety of information related to the media content (e.g., cacheability metadata, other associated metadata, and manifest data in data store 212 to which service 202 provides access). Alternatively, such information about the content, as well as the content itself may be provided and/or hosted by one or more separate platforms, e.g., CDN 214. In fact, implementations are contemplated in which cacheability metadata may be employed by an edge server of a CDN to support decision-making related to the caching of primary content in its associated cache(s).

It should be noted that, while logic 210 and 211, and data store 212 are shown as integrated with content service 202, implementations are contemplated in which some or all of these operate remotely from the associated content service, and/or are under the control of an independent entity. From these examples, those of skill in the art will understand the diversity of use cases to which the techniques described herein are applicable.

Figure 3:
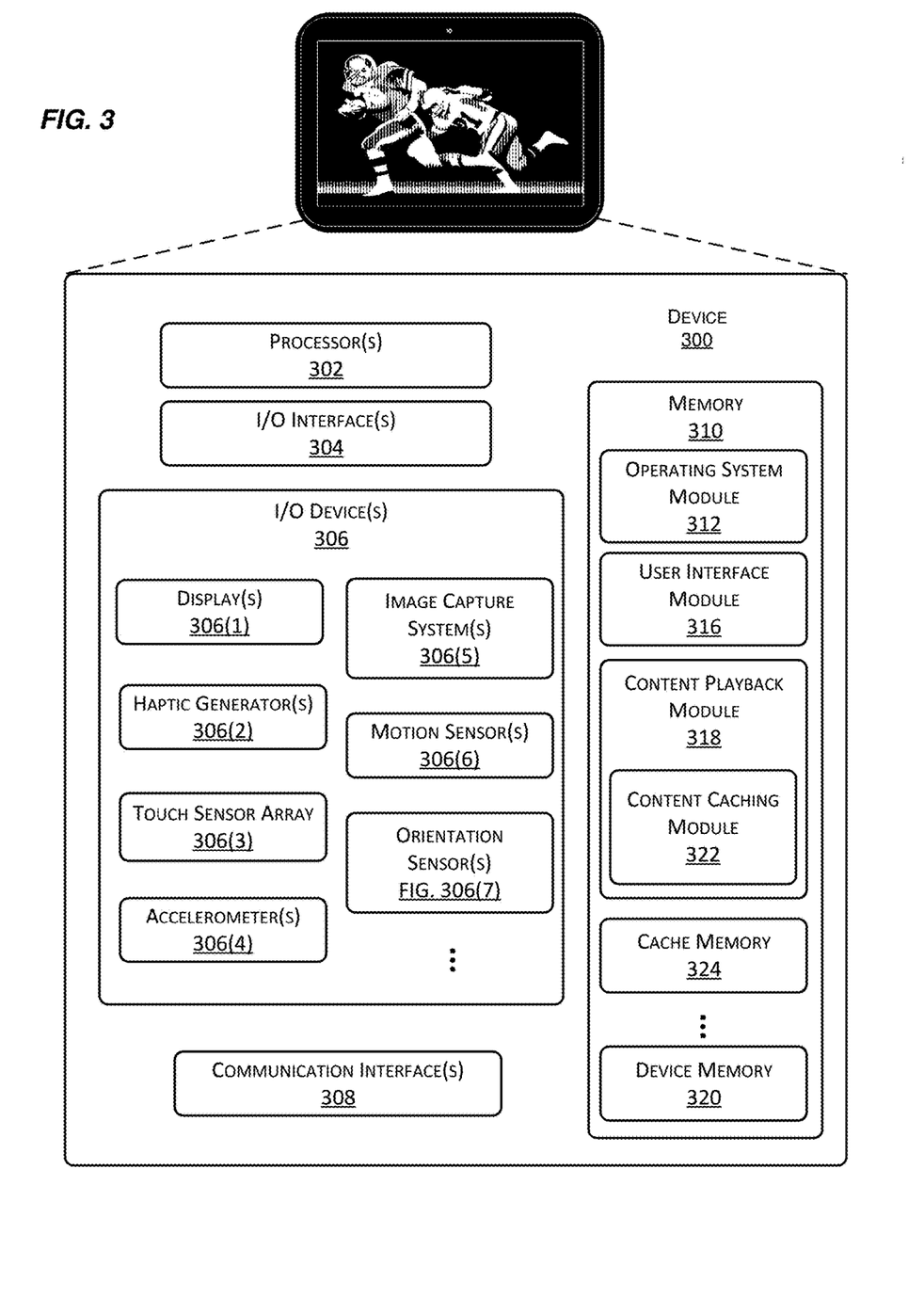
FIG. 3 illustrates an example of a client device which may be employed with implementations enabled by the present disclosure.

A block diagram of an example of a client device 300 suitable for use with various implementations is shown in FIG. 3. As mentioned above, it should be understood that device 300 may be any of a wide variety of device types. Device 300 (depicted as a tablet device) includes one or more single or multi-core processors 302 configured to execute stored instructions (e.g., in device memory 320). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface (e.g., an HDMI interface), and so forth. I/O interface(s) 304 is coupled to one or more I/O devices 306 which may or may not be integrated with client device 300.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 300 also includes one or more buses or other internal communications hardware or software (not shown) that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 310 includes at least one operating system (OS) module 312 configured to manage hardware resources such as I/O interfaces 304 and provide various services to applications or modules executing on processor(s) 302. Memory 310 also includes a user interface module 316, a content playback module 318, and other modules. Memory 310 also includes device memory 320 to store a wide variety of instructions and information using any of a variety of formats including, for example, flat files, databases, linked lists, trees, or other data structures. Such information includes content for rendering and display on display 306(1) including, for example, any type of video content. In some implementations, a portion of device memory 320 may be distributed across one or more other devices including servers, network attached storage devices, and so forth.

The logic (represented by 322 in FIG. 3) used to make decisions regarding the caching of content (in cache memory 324) using cacheability metadata as described herein may be implemented in a variety of ways, e.g., in hardware, software, and/or firmware. It will also be understood that device 300 of FIG. 3 is merely an example of a device with which various implementations enabled by the present disclosure may be practiced, and that a wide variety of other devices types may also be used (e.g., devices 206-1 to 206-5). The scope of this disclosure should therefore not be limited by reference to device-specific details.

Specific implementations enabled by the present disclosure will now be described with reference to Dynamic Adaptive Streaming over HTTP (DASH) and HTTP Live Streaming (HLS). However, it should be noted that the present disclosure is not limited to these examples, instead covering a wider range of implementations in which cacheability metadata is communicated to client devices to support client-side caching of content. It should also be noted that the term "manifest data" refers to both DASH manifest and HLS playlists as well as any other data used by client devices to generate requests for fragments, segments, or ranges of content.

DASH is an adaptive streaming technology that enables DASH media players on client devices to select from among differently encoded fragment options for each range of content depending on various parameters or constraints such as, for example, available bandwidth. A particular content presentation is represented by a DASH Media Presentation Description (MPD) or DASH manifest, a hierarchical data structure that includes at its one of its higher levels of abstraction, the concept of a period which may correspond to a particular type of content, e.g., primary content, secondary content, etc. DASH media players use the information in a DASH manifest to construct requests for the content fragments of each period.

HLS is another adaptive streaming technology that enables media players on client devices to select from among differently encoded fragment options for a particular range of content. HLS has continuous content streams with no concept of periods but employs the concept of a "presentation time" tag which is the primary identifier to support synchronization across multiple quality levels. An HLS playlist is a master manifest with references to sub-manifests for the different components of the presentation (e.g., video, audio, subtitles). Fragment sequence numbers and presentation times are represented in the sub-manifest along with the references to the particular fragments. The HLS media player uses this information to construct fragment requests. A switch to a different type of content (e.g., from primary to secondary) is represented in the playlist by a discontinuity tag that indicates the presentation time of the last fragment preceding the discontinuity will not be contiguous with the presentation time of the first fragment following the discontinuity. The player uses this information to handle the discontinuity and render the stream correctly.

Neither the HLS standard nor the DASH standard provides a mechanism for defining the cacheability of content. Specific implementations enabled by the present disclosure provide extensions to each standard to support client-side caching as described herein. Each extension provides syntax that specifies one or more characteristics of particular content that may be used by the client to determine how a piece of content will be cached. It should be noted that, despite references to DASH or HLS-specific implementations, the present disclosure is not so limited.

More generally, syntax and usage embodied in cacheability metadata are defined for different types of content and communicated to client devices to support client-side caching. Details relating to various implementations may be understood with reference to the flowchart of FIG. 4 and the following description.

Figure 4:
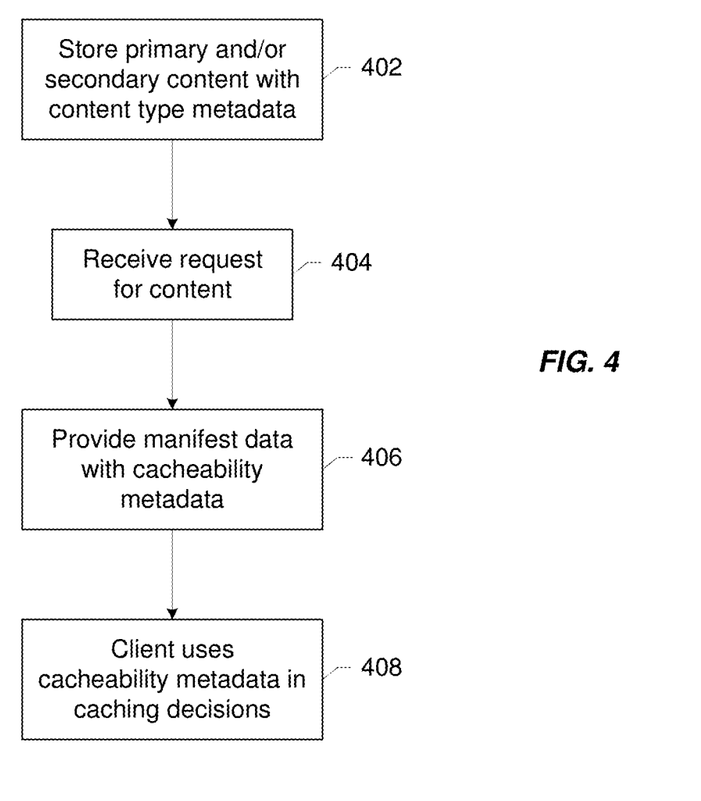
FIG. 4 is a flowchart illustrating operation of an implementation enabled by the present disclosure.

Both primary and secondary content are stored with associated content type metadata (402). The content type metadata may be information identifying the type of the associated content which may then be used to derive or identify cacheability metadata for inclusion in the manifest data provided to client devices at run time. Alternatively, the content type metadata may be or include the cacheability metadata itself. Regardless of the approach taken, the primary and secondary content may include a variety of content types.

For example, primary content (also referred to herein as main content) may include the various types of content presented to users for selection in a content library of a content service, e.g., movies, television shows, live events, broadcast channels, short-form videos (e.g., YouTube or TikTok), etc. The content type metadata may refer to all of these simply as main content. Alternatively, the content type metadata may refer to the various types of primary content more specifically to enable a more granular approach to caching of primary content.

Secondary content may include a number of content types that are supplementary to primary content and may be integrated with primary content for playback, e.g., in stitched manifest data with different periods or ranges of content corresponding to different types of primary and secondary content. Secondary content might include, for example, advertising content (e.g., ads dynamically inserted during playback), dub cards (e.g., listing available audio language tracks or voice actors in a dubbed audio track), other types of cards (e.g., logos, warnings, maturity ratings), virtual product placement content (e.g., for superimposing on primary content), and target or tailored content (e.g., previews of upcoming primary content), among others.

Depending on the type of content, various factors may be considered when specifying its cacheability. For example, primary content that is purchased or part of a subscription or account may be considered high value and therefore more suitable for remaining in a client-side cache longer than other types of content. This might include other types of primary content such as, for example, short-form video content that might only be viewed once or a few times within a short time frame and so less suitable for longer term caching. It may also include, for example, advertising content that is dynamically inserted and/or has a short shelf life and so may be suitable for only very short-term caching or not at all. Virtual product placement content might be specific to a particular content title or useful across multiple titles and/or have a short shelf life. So, depending on the nature of this content, it might be suitable for short, long, or even some mid-range level of caching. The length of time for which an item of content is considered cacheable is referred to herein as "caching duration."

Depending on the implementation, caching duration may represent a wide variety of time frames and numbers of categories and/or may be configurable. For example, an implementation might only specify two categories of caching duration, e.g., short-term cacheable and long-term cacheable. Another implementation might include one or more additional categories between two extremes. Moreover, the time frames corresponding to each category might vary considerably depending on the application. For example, short-term cacheable might refer to a suitable caching time frame of minutes, hours, or days, while long-term cacheable might refer to a time frame of days, weeks, or months. More generally, there can be any number of different types of content, each having an associated caching duration which is appropriate or useful for that type of content.

In other examples, the cacheability of different types of secondary content might vary depending on the type. Secondary content that includes logos, warnings, or maturity ratings may be integrated with multiple, even many, primary content titles and so may have a high degree of cacheability based on that. By contrast, dub cards are typically associated with only a single primary content title and so may be considered less cacheable in this respect. On the other hand, because a dub card is integrated with specific primary content, its cacheability might be tied to the cacheability of the corresponding primary content. In any case, the extent to which a particular item of content may be used across different items of primary content is referred to herein as "caching breadth."

Depending on the implementation, caching breadth may represent a variety of categories and breadths and/or may be configurable. For example, caching breadth could be specified as "per-title" or "across-title," with the former meaning that the content item is only used with one primary content title, and the latter meaning it can be used with multiple content titles. Alternatively, caching breadth might be specified as "low" or "high," with the division between the two categories being some threshold number of primary content titles with which the item of secondary content is associated. In yet another alternative, the caching breadth might be specified as a value that represents the number of primary content titles with which the item of content may be associated. More generally, caching breadth may be specified in any way that represents a content item's use or potential for use with other content items.

Referring back to FIG. 4, when a content service receives a request for specific primary content from a client device (404), manifest data representing one or more ranges of primary content and one or more ranges of secondary content are provided to the requesting client device (406). Depending on the implementation and/or the type of content, the manifest data may be generated on the fly (e.g., from master manifest data or manifest data updates from a packager), or retrieved from a data store or cache (e.g., in a CDN).

The manifest data provided to the client device includes cacheability metadata for each range or period of content. As discussed above, the cacheability data may be derived based on the identification of the type of the associated content (e.g., as specified in content type metadata), or retrieved from storage with the corresponding content. And depending on the implementation, the cacheability metadata may be represented in a variety of ways.

According to a particular DASH implementation, existing DASH-compliant tags are used to embed the cacheability metadata in the DASH manifest. According to a more specific DASH implementation, the AssetIdentifier and SupplementalProperty tags are used in the following way.

The AssetIdentifier tag includes a string that uniquely identifies the content of the corresponding period across container format, codec, and frame rate, i.e., any dimension that make a particular item of content different from another encoding and packaging of that same content. This information may be used to uniquely identify the content for caching purposes.

One or more SupplementalProperty tags specify either or both of the caching duration and/or caching breadth of the corresponding period of content. According to a more specific implementation, caching breadth is specified as either "across-title" or "per-title." The former means that the content is not unique to the particular primary content with which it has been associated, with the implication that the caching of this content may make it reusable with other content. The latter means that the content is unique to the particular title with which it has been associated, with the implication that the caching of this content will not result in its reuse with other content. As discussed above, this is merely one example of a way in which caching breadth may be specified in implementations in which caching breadth is a defined characteristic of the content.

According to the same or another specific implementation, caching duration is specified as either "short-term" or "long-term." The former means that the expected cacheability time frame of the content should be relatively short for the given application, while the latter means that the expected cacheability time frame of the content should be relatively long. As discussed above, the nature of these time frames may vary considerably depending on the implementation. Also as discussed above, this is merely one example of a way in which caching duration may be specified in implementations in which caching duration is a defined characteristic of the content.

According to a particular HLS implementation, a custom HLS tag is used to embed the cacheability metadata in the HLS playlist. According to a more specific HLS implementation, the custom tag is associated with each discontinuity tag that represents a change to a new type of content. As with the DASH implementation, one or more of these custom tags may be used to uniquely identify the item of content, the caching breadth of the content, and/or the caching duration of the content.

According to another HLS implementation, a standard HLS tag may be used in a non-standard way to communicate the cacheability metadata. For example, in the context of video-on-demand (VOD) content, metadata can be embedded in a playlist using EXT-X-DATERANGE tags with associated fake PROGRAM-DATE-TIME metadata to remain HLS-compliant). EXT-X-DATERANGE tags may also be employed with live content with valid PROGRAM-DATE-TIME metadata. The present disclosure is therefore not limited to the use of custom tags in the context of HLS.

Referring again to FIG. 4, the media player on the client device (or an associated module) uses the cacheability metadata embedded in the manifest data to determine how to cache each range or period of content (408).

According to some implementations, the media player's cache eviction policy may be configured to be specifically responsive to the content characteristic(s) specified in the cacheability metadata. On the other hand, a media player may still make decisions based on other parameters such as, for example, the availability of local memory or processing resources. In addition, the quality of the particular content representation (e.g., as represented by resolution or bit rate) may be considered by the media player (in conjunction with the cacheability metadata) in its decision to cache and/or evict the content from the cache.

According to various implementations, either or both of caching duration and caching breadth may be specified in the cacheability metadata. In implementations in which both are specified, a media player may be configured to use these characteristics in combination to make caching decisions. For example, in an implementation in which caching duration is specified as either "long-term" or "short-term," and caching breadth is specified as either "per-title" or "across-title," different combinations of these dimensions may be used to specify cacheability with greater granularity than would be possible for implementations employing only one or the other. For example, content that is specified as both "long-term" and "across-title" would be expected to be content for which caching would provide the greatest benefit. By contrast, content that is specified as both "short-term" and "per-title" would be expected to be content for which caching would provide little or no benefit.

As will be appreciated with reference to the foregoing, communicating the cacheability of each period or range of content to a client device allows the client device to make intelligent decisions about whether and/or how to cache each type of content based on its available resources. It should also be noted that cacheability metadata as described herein may be employed in other contexts and by other devices or systems without departing from the scope of the present disclosure. For example, implementations are contemplated in the context of downloaded content in which a client device employs such metadata to manage the storage of different types of content in its download library, e.g., a client might maintain primary content from a downloaded movie title or television episode but not secondary content that is time-sensitive, e.g., pre-roll preview of an upcoming live event. In another example, metadata as described herein might be used by an edge server of a CDN to make decisions about whether and how to cache primary and secondary content being requested by client devices.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A computer-implemented method, comprising:
    storing a plurality of items of primary content, each item of primary content being stored with associated content type metadata identifying the associated item of primary content as a primary content type;
    storing a plurality of items of secondary content, each item of secondary content being stored with associated content type metadata identifying the associated item of secondary content as one of a plurality of types of secondary content;
    receiving a request from a client device to establish a Dynamic Adaptive Streaming over HTTP (DASH) session for a first item of primary content;
    generating a DASH manifest representing a plurality of periods of content, one or more of the periods of content corresponding to the first item of primary content, one or more of the periods of content corresponding to one or more of the items of secondary content, the DASH manifest further including cacheability metadata associated with each of the periods of content using one or more DASH-compliant tags, the cacheability metadata for each period of content corresponding to the content type metadata stored with the corresponding item of content and being configured for use by the client device in determining how to cache the associated period of content; and
    transmitting the DASH manifest to the client device.

2. The method of claim 1, wherein the cacheability metadata specifies that the associated period of content is long-term cacheable or short-term cacheable.

3. The method of claim 1, wherein the cacheability metadata specifies that the associated period of content may be used with at least a first number of the items of primary content.

4. The method of claim 1, wherein the plurality of types of secondary content include two or more of advertising content, logo content, warning content, maturity rating content, virtual product placement content, targeted content, tailored content, or dub card content.

5. A system, comprising one or more processors and memory configured to:
    receive a request corresponding to an item of primary content from a client device; and
    provide manifest data to the client device, the manifest data including references to a plurality of ranges of content, one or more of the ranges of content corresponding to the item of primary content, one or more of the ranges of content corresponding to one or more of a plurality of items of secondary content, the manifest data further including cacheability metadata associated with each of the ranges of content, the cacheability metadata for each range of content representing one or more characteristics of the associated range of content and being configured for use by the client device in determining how to store the associated range of content.

6. The system of claim 5, wherein the manifest data is a Dynamic Adaptive Streaming over HTTP (DASH) manifest in which the ranges of content are represented as periods of content, and wherein the DASH manifest associates the cacheability metadata with each of the periods of content using one or more DASH-compliant tags.

7. The system of claim 6, wherein the one or more DASH-compliant tags include one or both of the AssetIdentifier tag or the SupplementalProperty tag.

8. The system of claim 5, wherein the manifest data is an HTTP Live Streaming (HLS) playlist in which the ranges of content are separated by discontinuity tags, and wherein the HLS playlist associates the cacheability metadata with each of the ranges of content.

9. The system of claim 8, wherein the HLS playlist associates the cacheability metadata with each of the ranges of content using one or more custom tags or one or more HLS-compliant tags.

10. The system of claim 5, wherein the cacheability metadata represents a caching duration for the associated range of content.

11. The system of claim 5, wherein the cacheability metadata represents a breadth of use for the associated range of content.

12. The system of claim 5, wherein the plurality of items of secondary content represent a plurality of types of secondary content including two or more of advertising content, logo content, warning content, maturity rating content, virtual product placement content, targeted content, tailored content, or dub card content.

13. A device, comprising one or more processors and memory configured to:
    generate a request corresponding to an item of primary content;
    receive manifest data, the manifest data including references to a plurality of ranges of content, one or more of the ranges of content corresponding to the item of primary content, one or more of the ranges of content corresponding to one or more of a plurality of items of secondary content, the manifest data further including cacheability metadata associated with each of the ranges of content, the cacheability metadata for each range of content representing one or more characteristics of the associated range of content; and
    determine how to store one or more of the ranges of content using the cacheability metadata associated with each.

14. The device of claim 13, wherein the manifest data is a Dynamic Adaptive Streaming over HTTP (DASH) manifest in which the ranges of content are represented as periods of content, and wherein the DASH manifest associates the cacheability metadata with each of the periods of content using one or more DASH-compliant tags.

15. The device of claim 13, wherein the manifest data is an HTTP Live Streaming (HLS) playlist in which the ranges of content are separated by discontinuity tags, and wherein the HLS playlist associates the cacheability metadata with each of the ranges of content using one or more custom tags or one or HLS-compliant tags.

16. The device of claim 13, wherein the cacheability metadata represents a caching duration for the associated range of content.

17. The device of claim 13, wherein the cacheability metadata represents a breadth of use for the associated range of content.

18. The device of claim 13, wherein the one or more processors and memory are configured to determine how to store one or more of the ranges of content by operating a cache eviction algorithm using the cacheability metadata as input.

19. The device of claim 18, wherein the one or more processors and memory are configured to operate the cache eviction algorithm using a quality level of a cached content item as input.

20. The device of claim 13, wherein the plurality of items of secondary content represent a plurality of types of secondary content including two or more of advertising content, logo content, warning content, maturity rating content, virtual product placement content, targeted content, tailored content, or dub card content.

* * * * *